US012785255B2

(12) United States Patent
Liu et al.

(10) Patent No.: US 12,785,255 B2
(45) Date of Patent: Nov. 3, 2026

(54) BASE STATION ANTENNAS

(71) Applicant: Outdoor Wireless Networks LLC, Claremont, NC (US)

(72) Inventors: Nengbin Liu, Suzhou (CN); Xun Zhang, Suzhou (CN); Dandan Ren, Suzhou (CN)

(73) Assignee: OUTDOOR WIRELESS NETWORKS LLC, Richardson, TX (US)

( * ) Notice: Subject to any disclaimer, the term of this patent is extended or adjusted under 35 U.S.C. 154(b) by 231 days.

(21) Appl. No.: 18/653,103

(22) Filed: May 2, 2024

(65) Prior Publication Data

US 2024/0372248 A1 Nov. 7, 2024

Related U.S. Application Data

(60) Provisional application No. 63/500,318, filed on May 5, 2023.

(51) Int. Cl.
*H01Q 1/24* (2006.01)
*H01Q 1/52* (2006.01)
*H01Q 15/00* (2006.01)

(52) U.S. Cl.
CPC ............. *H01Q 1/246* (2013.01); *H01Q 1/521* (2013.01); *H01Q 1/526* (2013.01); *H01Q 15/0013* (2013.01)

(58) Field of Classification Search
CPC ................................. H01Q 1/246; H01Q 1/42
See application file for complete search history.

(56) References Cited

U.S. PATENT DOCUMENTS

| | | | |
|---|---|---|---|
| 5,184,145 | A | 2/1993 | Devillers et al. |
| 5,451,969 | A | 9/1995 | Toth et al. |
| 5,982,339 | A | 11/1999 | Lalezari et al. |
| 6,025,812 | A | 2/2000 | Gabriel et al. |
| 6,339,047 | B1 | 1/2002 | Christopherson et al. |
| 6,388,637 | B1 | 5/2002 | Davis |
| 6,831,615 | B2 | 12/2004 | Goettl |
| 7,679,576 | B2 | 3/2010 | Riedel et al. |
| 7,907,096 | B2 | 3/2011 | Timofeev et al. |
| 7,999,752 | B2 | 8/2011 | Riedel |

(Continued)

FOREIGN PATENT DOCUMENTS

| | | | |
|---|---|---|---|
| CN | 1886864 | A | 12/2006 |
| CN | 100492763 | C | 5/2009 |

(Continued)

OTHER PUBLICATIONS

Ben A. Munk, Frequency Selective Surfaces: Theory and Design, ISBN: 978-0-471-37047-5; DOI:10.1002/0471723770; Apr. 2000, Copyright © 2000 John Wiley & Sons, Inc.

(Continued)

*Primary Examiner* — David E Lotter
(74) *Attorney, Agent, or Firm* — Myers Bigel, P.A.

(57) ABSTRACT

Base station antennas include a base station antenna housing with an internal cage defining a monolithic structure with front and rearward sets of longitudinally extending and laterally extending struts providing a light-weight, non-metallic body with radiating elements positioned inside the cage. The cage can attach to a primary reflector and can hold first and second matching layers and a reflector.

21 Claims, 8 Drawing Sheets

(56) References Cited

U.S. PATENT DOCUMENTS

| | | | |
|---|---|---|---|
| 10,396,460 B2 | 8/2019 | Kosaka et al. | |
| 10,978,840 B2 | 4/2021 | Paynter et al. | |
| 11,070,269 B2 | 7/2021 | Lee et al. | |
| 11,482,774 B2 | 10/2022 | Hou et al. | |
| 11,581,631 B2 | 2/2023 | Li et al. | |
| 11,652,300 B2 | 5/2023 | Li et al. | |
| 11,658,372 B2 | 5/2023 | Kosaka | |
| 2004/0169612 A1 | 9/2004 | Song et al. | |
| 2004/0201542 A1 | 10/2004 | Gottl et al. | |
| 2004/0259597 A1 | 12/2004 | Gothard et al. | |
| 2005/0134522 A1 | 6/2005 | Waltho | |
| 2005/0179610 A1 | 8/2005 | Le et al. | |
| 2005/0264463 A1 | 12/2005 | Gottl et al. | |
| 2006/0273865 A1 | 12/2006 | Timofeev et al. | |
| 2007/0229385 A1 | 10/2007 | Deng et al. | |
| 2007/0241979 A1 | 10/2007 | Yang | |
| 2008/0036674 A1 | 2/2008 | Riedel et al. | |
| 2009/0135076 A1 | 5/2009 | Foo | |
| 2009/0224994 A1 | 9/2009 | Le et al. | |
| 2012/0075155 A1 | 3/2012 | Lindmark et al. | |
| 2012/0087284 A1 | 4/2012 | Linehan et al. | |
| 2012/0280874 A1 | 11/2012 | Kim et al. | |
| 2013/0234883 A1 | 9/2013 | Ma et al. | |
| 2014/0313095 A1 | 10/2014 | Pu et al. | |
| 2015/0084823 A1 | 3/2015 | Wang et al. | |
| 2015/0097739 A1 | 4/2015 | Samuel | |
| 2015/0263424 A1 | 9/2015 | Sanford et al. | |
| 2016/0365618 A1 | 12/2016 | Kim et al. | |
| 2016/0372839 A1 | 12/2016 | Watson et al. | |
| 2017/0040665 A1 | 2/2017 | Takashima et al. | |
| 2017/0040679 A1 | 2/2017 | Fröhler et al. | |
| 2017/0099041 A1 | 4/2017 | Wall | |
| 2017/0170549 A1 | 6/2017 | Buondelmonte | |
| 2018/0269577 A1 | 9/2018 | Kosaka et al. | |
| 2018/0290356 A1 | 10/2018 | Isohätälä et al. | |
| 2018/0323513 A1 | 11/2018 | Varnoosfaderani et al. | |
| 2018/0331419 A1 | 11/2018 | Varnoosfaderani et al. | |
| 2019/0123426 A1 | 4/2019 | Bryce | |
| 2019/0173162 A1 | 6/2019 | Farzaneh et al. | |
| 2019/0181557 A1 | 6/2019 | Isik et al. | |
| 2019/0190146 A1 | 6/2019 | Hand et al. | |
| 2019/0267700 A1 | 8/2019 | Hendrix et al. | |
| 2019/0267701 A1 | 8/2019 | Kim et al. | |
| 2019/0268046 A1 | 8/2019 | Kim et al. | |
| 2019/0312338 A1 | 10/2019 | Guntupalli et al. | |
| 2019/0312394 A1 | 10/2019 | Paynter et al. | |
| 2019/0393597 A1 | 12/2019 | Kosaka et al. | |
| 2020/0076079 A1 | 3/2020 | Shan et al. | |
| 2020/0099139 A1 | 3/2020 | Rebegea et al. | |
| 2020/0288495 A1 | 9/2020 | Gao et al. | |
| 2020/0321700 A1 | 10/2020 | Wu et al. | |
| 2021/0057801 A1 | 2/2021 | Zhao et al. | |
| 2021/0075092 A1 | 3/2021 | Su et al. | |
| 2021/0218156 A1 | 7/2021 | Patel et al. | |
| 2021/0226344 A1 | 7/2021 | Wu et al. | |
| 2021/0305717 A1 | 9/2021 | Hou et al. | |
| 2022/0021123 A1 | 1/2022 | Koul et al. | |
| 2022/0102842 A1 | 3/2022 | Li et al. | |
| 2023/0104131 A1 | 4/2023 | Varnoosfaderani et al. | |
| 2023/0208051 A1 | 6/2023 | Zhang et al. | |
| 2023/0352811 A1* | 11/2023 | Ponn | H01Q 21/24 |
| 2023/0395971 A1 | 12/2023 | Yin et al. | |
| 2024/0014545 A1* | 1/2024 | Huang | H01Q 15/14 |
| 2024/0150619 A1* | 5/2024 | Delforce | C09J 7/255 |
| 2024/0186711 A1 | 6/2024 | Li et al. | |

FOREIGN PATENT DOCUMENTS

| | | |
|---|---|---|
| CN | 201528038 U | 7/2010 |
| CN | 101950846 A | 1/2011 |
| CN | 201893434 U | 7/2011 |
| CN | 102800956 A | 11/2012 |
| CN | 103490175 A | 1/2014 |
| CN | 103715521 A | 4/2014 |
| CN | 104319486 A | 1/2015 |
| CN | 206225553 U | 6/2017 |
| CN | 107453044 A | 12/2017 |
| CN | 107834198 A | 3/2018 |
| CN | 108242596 A | 7/2018 |
| CN | 109219905 A | 1/2019 |
| CN | 110323564 A | 10/2019 |
| CN | 111129769 A | 5/2020 |
| CN | 107459805 B | 11/2020 |
| CN | 111989824 A | 11/2020 |
| CN | 112201939 A | 1/2021 |
| CN | 215418610 U | 1/2022 |
| CN | 114094347 A | 2/2022 |
| EP | 0982800 A2 | 3/2000 |
| EP | 1204161 A1 | 5/2002 |
| EP | 2784876 A1 | 10/2014 |
| EP | 2827449 A2 | 1/2015 |
| EP | 3544204 A2 | 9/2019 |
| EP | 3751665 A1 | 12/2020 |
| EP | 3966898 A2 | 3/2022 |
| JP | S6081902 A | 5/1985 |
| JP | 2006108841 A | 4/2006 |
| KR | 102129787 B1 | 7/2020 |
| WO | 9700586 A1 | 1/1997 |
| WO | 2009061966 A1 | 5/2009 |
| WO | 2011160649 A2 | 12/2011 |
| WO | 2011160849 A1 | 12/2011 |
| WO | 2013016939 A1 | 2/2013 |
| WO | 2019100325 A1 | 5/2019 |
| WO | 2019154362 A1 | 8/2019 |
| WO | 2019236203 A2 | 12/2019 |
| WO | 2020010039 A1 | 1/2020 |
| WO | 2020072880 A1 | 4/2020 |
| WO | 2020159902 A1 | 8/2020 |
| WO | 2021150384 A1 | 7/2021 |
| WO | 2021195040 A2 | 9/2021 |
| WO | 2021222217 A1 | 11/2021 |
| WO | 2022055764 A1 | 3/2022 |
| WO | 2023029431 A1 | 3/2023 |

OTHER PUBLICATIONS

He et al. "Novel Dual-Band, Dual-Polarized, Miniaturized and Low-Profile Base Station Antenna" IEEE Transactions On Antennas and Propagation 63(12):5399-5408 (Dec. 2015).

Joozdani et al. "Equivalent Circuit Model of Frequency Selective Surfaces Embedded in Non-homogeneous Dielectric Slab" 24th Iranian Conference on Electrical Engineering (ICEE), pp. 380-383 (2016).

Shepard et al. "Argos: Practical Many-Antenna Base Stations" Proceedings of the 18th Annual International Conference on Mobile Computing and Networking (12 pages) (Aug. 26, 2012).

Vasquez-Peralvo et al. "Inductive Frequency Selective Surface: An Application for Dichroic Sub-Reflectors" IEEE Access, vol. 8, pp. 22721-22732 (2020).

Chang , et al., "Equivalent Circuit Modeling of Active Frequency Selective Surfaces", Radio and Wireless Symposium, pp. 663-666 (2008).

* cited by examiner

BASE STATION ANTENNAS

RELATED APPLICATIONS

This application claims priority to and the benefit of U.S. Provisional Application Ser. No. 63/500,318, filed May 5, 2023, the contents of which are hereby incorporated by reference as if recited in full herein.

BACKGROUND

The present invention generally relates to radio communications and, more particularly, to base station antennas for cellular communications systems.

Cellular communications systems are well known in the art. In a cellular communications system, a geographic area is divided into a series of regions that are referred to as "cells" which are served by respective base stations. The base station may include one or more antennas that are configured to provide two-way radio frequency ("RF") communications with mobile subscribers that are within the cell served by the base station. In many cases, each cell is divided into "sectors." In one common configuration, a hexagonally shaped cell is divided into three 120° sectors in the azimuth plane, and each sector is served by one or more base station antennas that generate radiation patterns (also referred to as "antenna beams") that have an azimuth Half Power Beamwidth (HPBW) of approximately 65°. Typically, the base station antennas are mounted on a tower or other raised structure, with the antenna beams that are generated by the base station antennas directed outwardly. Base station antennas are often implemented as linear or planar phased arrays of radiating elements.

In order to accommodate the increasing volume of cellular communications, cellular operators have added cellular service in a variety of new frequency bands. In order to increase capacity without further increasing the number of base station antennas, multi-band base station antennas have been introduced which include multiple linear arrays of radiating elements. Additionally, base station antennas are now being deployed that include "beamforming" arrays of radiating elements that include multiple columns of radiating elements that are connected to respective ports of a radio which allows the array to perform active beamforming (i.e., the shapes and pointing directions generated by the antenna may be adaptively changed to improve the performance of the antenna). In some cases, the radios for these beamforming arrays may be integrated into the antenna. These beamforming arrays typically operate in higher frequency bands, such as various portions of the 3.1-5.8 GHz frequency band. Antennas having integrated radios (e.g., radios that are within the antenna or mounted on the back of the antenna) that can adjust the amplitude and/or phase of the sub-components of an RF signal that are transmitted through individual radiating elements or small groups thereof are referred to as "active antennas." Active antennas can generate narrowed beamwidth, high gain, antenna beams and can steer the generated antenna beams in different directions by changing the amplitudes and/or phases of the sub-components of RF signals that are transmitted through the antenna.

Further details of example conventional antennas can be found in co-pending WO2019/236203 and WO2020/072880, the contents of which are hereby incorporated by reference as if recited in full herein.

With the development of wireless communication technology, an integrated base station antenna including a passive antenna device and active antenna device has emerged. The passive antenna device may include one or more arrays of radiating elements that are configured to generate relatively static antenna beams, such as antenna beams that are configured to cover a 120-degree sector (in the azimuth plane) of an integrated base station antenna. The arrays in a passive antenna may include arrays that operate, for example, under second generation (2G), third generation (3G) and/or fourth generation (4G) cellular network standards. These arrays are not configured to perform active beamforming operations, although they typically have remote electronic tilt (RET) capabilities which allow the shape of the antenna beam to be changed via electromechanical means in order to change the coverage area of the antenna beam. The active antenna device may include one or more arrays of radiating elements that operate under fifth generation (5G or higher version) cellular network standards. In 5G mobile communication, the frequency range of communication includes a main frequency band (specific portion of the range 450 MHZ-6 GHZ) and an extended frequency band (24 GHZ-73 GHZ, i.e., millimeter wave frequency band, mainly 28 GHZ, 39 GHz, 60 GHz and 73 GHZ). The frequency range used in 5G mobile communication includes frequency bands that use higher frequencies than the previous generations of mobile communication. These arrays typically have individual amplitude and phase control over subsets of the radiating elements therein to perform active beamforming.

The active antenna device is capable of emitting high-frequency electromagnetic waves (for example, high-frequency electromagnetic waves in the 2.3-4.2 GHz frequency band or a portion thereof). At least a portion of the active antenna device is typically mounted rearwardly of the passive antenna device. Electromagnetic waves are transmitted through a front radome of the active antenna device and through a rear radome and front radome of the passive antenna device, which may hinder wave transmission of, for example, high-frequency electromagnetic waves emitted by the active antenna device.

SUMMARY

Embodiments of the present invention are directed to base station antennas with a non-metallic, light-weight structural cage providing laterally and longitudinally extending struts.

The cage may inhibit or reduce passive intermodulation distortion (PIM) that may otherwise arise using metal frame structures.

The cage can be configured to extend along a sub-length of a base station antenna housing, optionally positioned along a top to medial portion.

The base station antenna can further include at least one matching layer coupled to the cage. The at least one matching layer can be provided as a plurality of matching layer segments.

The base station antenna can further include a frequency selective surface (FSS) that can reside behind a first matching layer and a plurality of columns of first radiating elements that project forward of the FSS. The FSS can be configured to reflect electromagnetic waves within a first operational frequency band.

The FSS can be further configured such that electromagnetic waves within a second operational frequency band can propagate through the FSS.

The second operational frequency band can be higher than the first operational frequency band. A plurality of laterally spaced apart columns of second radiating elements that operate in the second operational frequency band can be provided by an active antenna module coupled to the base station antenna housing.

Embodiments of the present invention are directed to a base station antenna that includes: a base station antenna housing having a front radome and a rear and also having a non-metallic cage configured with a plurality of laterally and longitudinally extending struts positioned inside the base station antenna housing.

The cage can be a monolithic unitary body.

The base station antenna can further include a primary reflector in the base station antenna housing and the non-metallic cage can be attached to the primary reflector.

The longitudinally extending struts can be provided as a pair of laterally spaced apart front long struts and a pair of laterally spaced apart rear long struts, the front and rear long struts can be coupled/affixed together. The laterally extending struts can be provided as a plurality of laterally extending rear struts extending inward from and between the pair of longitudinally extending rear long struts.

The cage can have an electrically conductive ground path between the primary reflector and a metal segment residing behind a radiating element in the cage and/or the primary reflector and a grid reflector coupled to the cage can be electrically coupled.

The base station antenna can further include a reflector coupled to the cage.

The reflector can have a frequency selective surface can be coupled to a reside adjacent a rear of the cage, and can be coupled to a top, rear lateral segment of the cage and a bottom, rear lateral segment of the cage.

The laterally extending struts can include a plurality of longitudinally spaced apart narrow, rear lateral struts.

The narrow, rear lateral struts can have a medial segment between first and second end segments and a first connecting segment between the medial segment and the first end segment and a second connecting segment between the medial segment and the second end segment. The first end segment can be coupled to a rear, right side longitudinally extending strut of the plurality of longitudinally extending struts and the second end segment can be coupled to a rear, left side longitudinally extending strut of the plurality of longitudinally extending struts. The first and second end segments and the medial segments can have a greater longitudinal extent than the first and second connecting segments.

The base station antenna can further include at least one matching layer coupled to the cage.

The base station antenna can further include a plurality of longitudinally spaced apart projecting members, one projecting member coupled to one of medial segment of the medial segments of the narrow lateral struts.

The base station antenna can further include an active antenna module coupled to a rear of the base station antenna housing. The active antenna module can have a multiple column array of radiating elements positioned to reside behind the cage.

The base station antenna can further include a front matching layer and a spaced apart back matching layer, each coupled to the cage.

The base station antenna can further include a plurality of radiating elements inside the cage and a frequency selective surface coupled to the cage and positioned behind the plurality of radiating elements. The frequency selective surface can be configured to reflect, absorb or block electromagnetic waves from the radiating elements and can be configured to allow higher band electromagnetic waves to travel therethrough toward the front radome.

The base station antenna can further include an active antenna unit coupled to the base station antenna housing and a frequency selective surface coupled to the cage. The active antenna unit can have an array of radiating elements facing the cage and the array of radiating elements of the active antenna unit can be configured to propagate RF energy through a rear radome of the base station antenna housing and through the frequency selective surface.

The base station antenna can further include a passive intermodulation shield coupled to a rear of the base station antenna housing.

The longitudinally extending struts can be provided as a front set of the longitudinally extending struts and a back set of the longitudinally extending struts. The front set can be integrally attached to the back set. The back set of the longitudinally extending struts can be arranged to define a portion of a rectangular perimeter and can be coupled to lower and upper lateral segments of the cage and can reside behind the laterally extending struts.

At least some of the longitudinally and laterally extending struts can have a “U” shaped cross-section.

Other embodiments are directed to a base station antenna assembly that includes: a base station antenna housing having a front radome; a primary reflector in the base station antenna housing; a plurality of columns of first radiating elements configured for operating in a first operational frequency band inside the base station antenna housing, each column of first radiating elements comprising a plurality of first radiating elements arranged in a longitudinal direction; and a cage inside the base station antenna housing coupled to the primary reflector. The cage is non-metallic and has a monolithic cage body with a front set of longitudinally extending struts arranged to define long sides of a rectangular perimeter. The cage further includes a back set of longitudinally extending struts that merges into lower and upper lateral segments of the cage.

The front and back sets of longitudinally extending struts can be aligned in X and Y directions and be spaced apart in a Z direction of the base station antenna housing.

The base station antenna can further include a frequency selective surface (FSS) that is coupled to the cage. The FSS can reside behind the cage and the plurality of columns of first radiating elements. The FSS can be configured to reflect electromagnetic waves within a first operational frequency band.

The front set of longitudinally extending struts can extend between, coupled to, a bottom, front lateral strut and a top, front lateral strut of the cage with the front set of longitudinally extending struts terminating at the bottom, front lateral strut and the top, front lateral strut.

DETAILED DESCRIPTION

Embodiments of the present invention are directed to base station antennas. In the description that follows, these base station antennas will be described using terms that assume that the base station antenna is mounted for use on a tower, pole or other mounting structure with the longitudinal axis of the base station antenna extending along a vertical axis and the front of the base station antenna mounted opposite the tower, pole or other mounting structure pointing toward the target coverage area for the base station antenna. It will be appreciated that the base station antennas may not always be mounted so that the longitudinal axes thereof extend along a vertical axis. For example, the base station antennas may be tilted slightly (e.g., less than 10°) with respect to the vertical axis so that the resultant antenna beams formed by the base station antennas each have a small mechanical downtilt.

Figure 1:
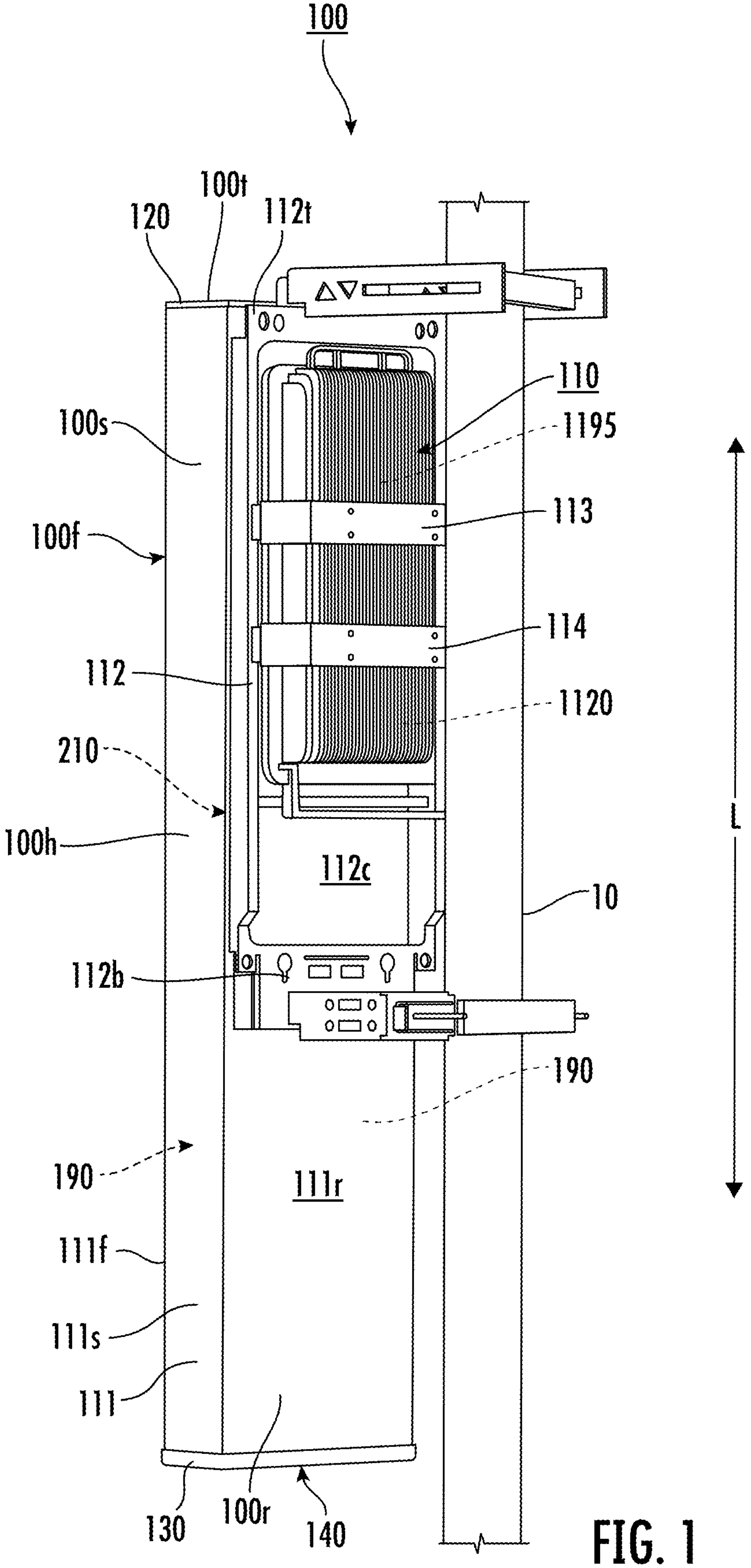
FIG. 1 is a rear, side perspective view a base station antenna comprising an active antenna module coupled to a housing enclosing a passive antenna assembly according to embodiments of the present invention.
Figure 5:
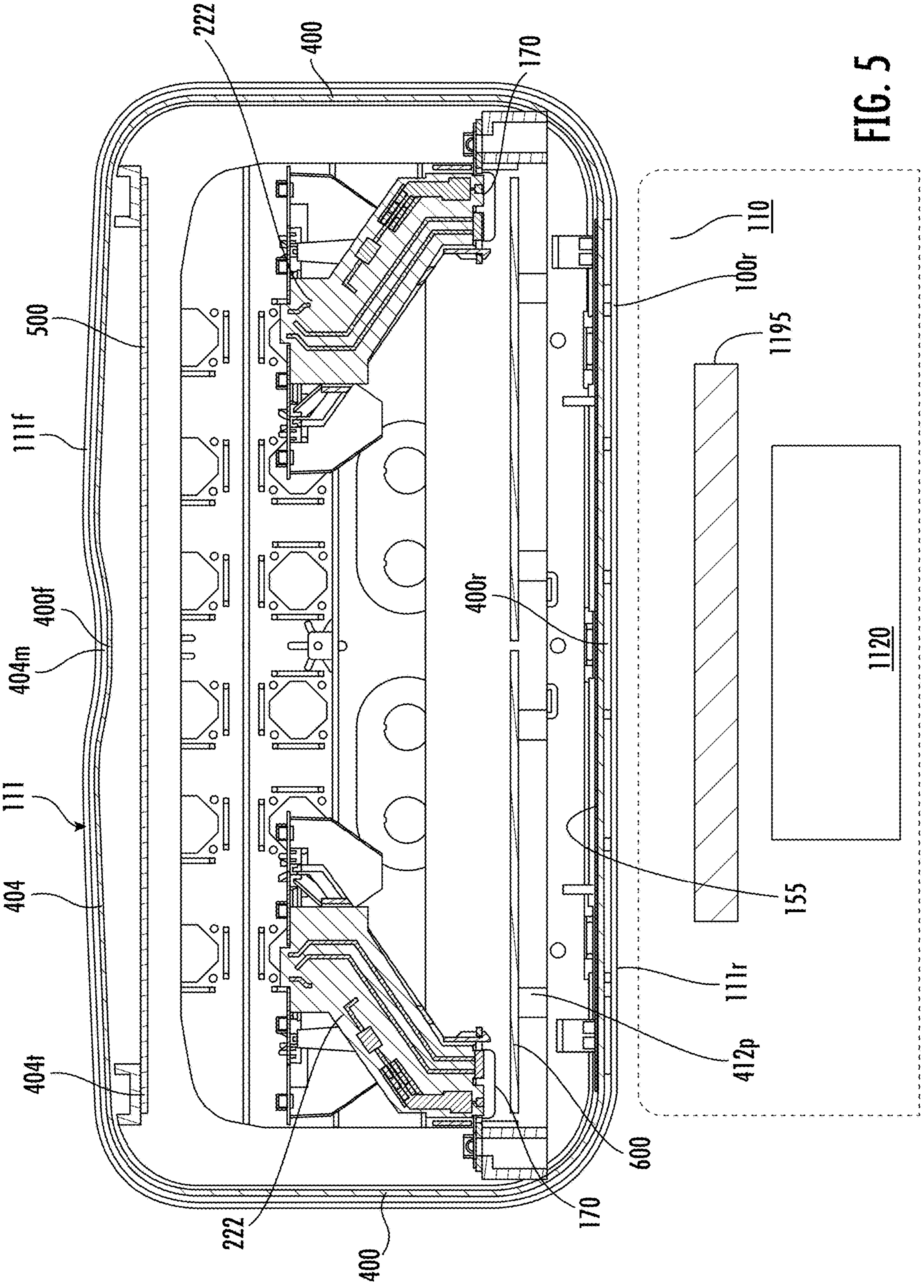
FIG. 5 is a simplified, lateral section view of a portion of the base station antenna housing illustrating the example cage shown in FIG. 2 with various of the components of the base station antenna according to embodiments of the present invention.
Figure 6:
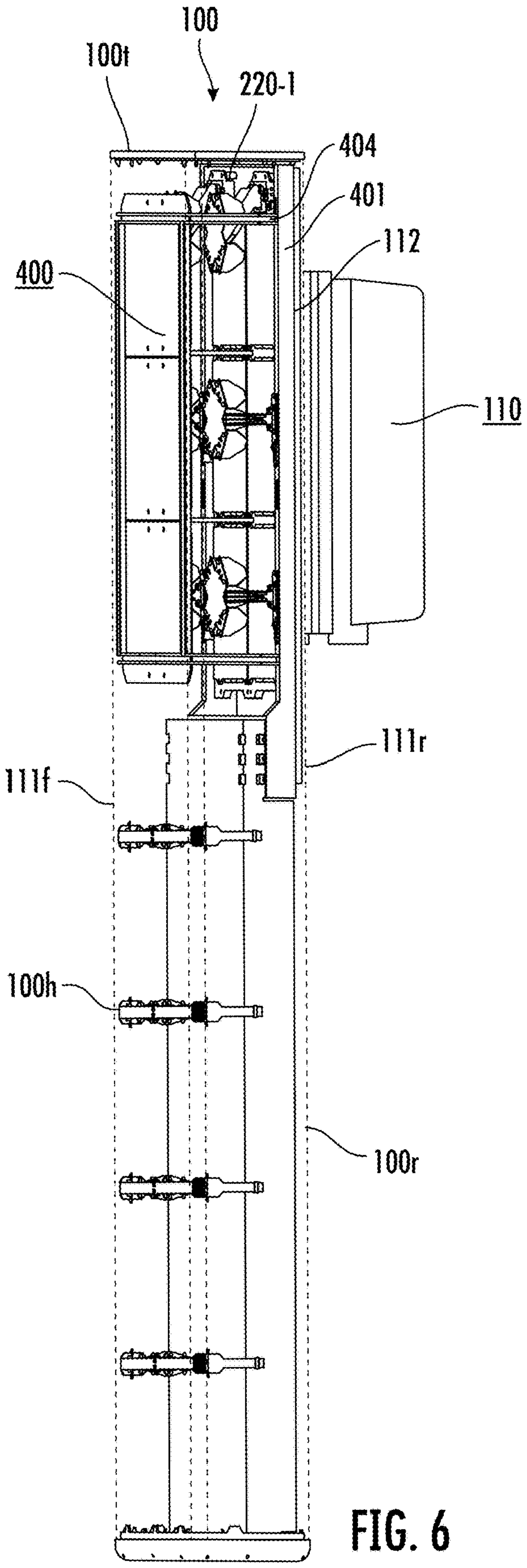
FIG. 6 is a partially transparent side view of the base station antenna shown in FIG. 1 showing the cage inside the base station antenna housing according to embodiments of the present invention.

FIG. 1 illustrates an example base station antenna 100 coupled to a pole 10. The base station antenna 100 has a housing **100*h* that holds a passive antenna assembly 190 and that can couple to or include at least one active antenna module 110. The term "active antenna module" is used interchangeably with "active antenna unit" and "AAU" and refers to a cellular communications unit comprising radio circuitry 1120 and a multiple column array of radiating elements 1195 (FIG. 5). The radio circuitry 1120 is capable of electronically adjusting the amplitude and/or phase of the subcomponents of an RF signal that are output to different radiating elements of an array of radiating elements or groups thereof. The active antenna module 110 may include both the radio circuitry and the radiating element array 1195** (e.g., a multi-input-multi-output (mMIMO) beamforming antenna array) and may include other components such as filters, a calibration network, an antenna interface signal group (AISG) controller and the like.

The active antenna module 110 can be provided as a single integrated unit or provided as a plurality of stackable units, including, for example, first and second sub-units such as a radio sub-unit with the radio circuitry and an antenna sub-unit with a multi-column array of radiating elements. The first and second sub-units can stackably attach together, in a front to back direction of the base station antenna 100, with the radiating element array 1195 closer to the front **100*f* of the housing 100*h*/front radome 111*f* of the radome 111 of base station antenna 100 than the radio circuitry unit 1120**.

As shown in FIG. 1, a frame 112 can be used with brackets 113, 114 to mount the AAU 110 to the housing **100*h*. The frame 112 can have an open space 112*c* between the two outer (long) sides. The open space 112*c* can extend a sub-length of the frame 112 between top and bottom portions 112*t*, 112*b*, respectively. A metal cover (not shown) can be formed by or coupled to the frame 112 and can reside behind the open space 112*c* and at least part of the active antenna module 110**. Other mounting configurations are contemplated as will be appreciated by those of skill in the art.

Still referring to FIG. 1, the base station antenna housing **100*h* may be substantially rectangular with a flat rectangular cross-section. At least a front side 100*f* of the housing 100*h* may be implemented as a radome 111 providing the front radome 111*f*. A "radome" refers to a dielectric cover that allows RF energy to pass through in certain frequency bands. A rear 100*r* of the housing 100*h* may also include a rear radome 111*r* that is opposite the front radome 111*f*. Optionally, the housing 100*h* and/or the radome 111 can also comprise two (narrow) sidewalls 100*s* providing side radomes 111*s* facing each other and extending rearwardly between the front radome 111*f* and the rear radome 111*r*. The sidewalls 100*s*, 111*s* can have a width, measured in a front-to-back direction, that is 40%-90% less than a lateral extent of the housing 100*h***.

The top side **100*t* of the housing 100*h* may be sealed in a waterproof manner and may comprise an end cap 120 and the bottom side 100*b* of the housing 100*h* may be scaled with a separate end cap 130 with RF ports 140. The front radome 111*f*, the rear radome 111*r* and the side radomes 111*s*** may comprise a monolithic structure in some embodiments.

The front side **100*f*, at least part of the sidewalls 100*s* and typically at least part of the rear 100*r* of the housing 100*h* are typically implemented as radomes that are substantially transparent to RF energy within the operating frequency bands of the passive antenna assembly 190 and active antenna module 110. At least part of the radome 111** may be formed of, for example, fiberglass or plastic.

The term "passive antenna assembly" refers to an antenna assembly having one or more arrays of radiating elements that are coupled to radios that are external to the antenna assembly, typically remote radio heads that are mounted in close proximity to the base station antenna housing **100*h*. The arrays of radiating elements included in the passive antenna assembly 190 are configured to form static antenna beams (e.g., antenna beams that are each configured to cover a sector of a base station). The passive antenna assembly 190 may comprise a backplane provided by a reflector 170, with radiating elements 222 projecting in front of the reflector 170 (FIG. 5) and the radiating elements can include one or more linear arrays 220-1, 220-2 (FIG. 7) of low band radiating elements 222 that operate in all or part of the 617-960 MHz frequency band and/or one or more linear arrays of mid-band radiating elements that operate in all or part of the 1427-2690 MHz frequency band. The passive antenna assembly 190 is mounted in the housing 100*h* of base station antenna 100 and one or more active antenna modules 110 can releasably (detachably) couple (e.g., directly or indirectly attach) to a back of the base station antenna housing 100*h***. Further discussion of example passive antenna assemblies can be found in U.S. Pat. No. 11,482,774, the contents of which are hereby incorporated by reference as if recited in full herein.

Radiation (electromagnetic waves) transmitted by the array of radiating elements 1195 in the active antenna unit 110 can pass through a front radome of the active antenna module 110, enter the housing 100*h* from the back 100*r* and transmit out the front radome 111*f*, thus traveling through at least three radome walls spaced apart in a front-to-back direction. Active antenna modules 110 are often configured to operate using time division duplexing multiple access schemes in which the transmit and receive signals do not overlap in time, but instead the active antenna module transmits RF signals during selected time slots and receives RF signals during other time slots. The passive antenna assembly 190 can operate under frequency division duplexing (FDD) multiple access schemes where transmit and receive operations may occur at the same time.

Figure 2:
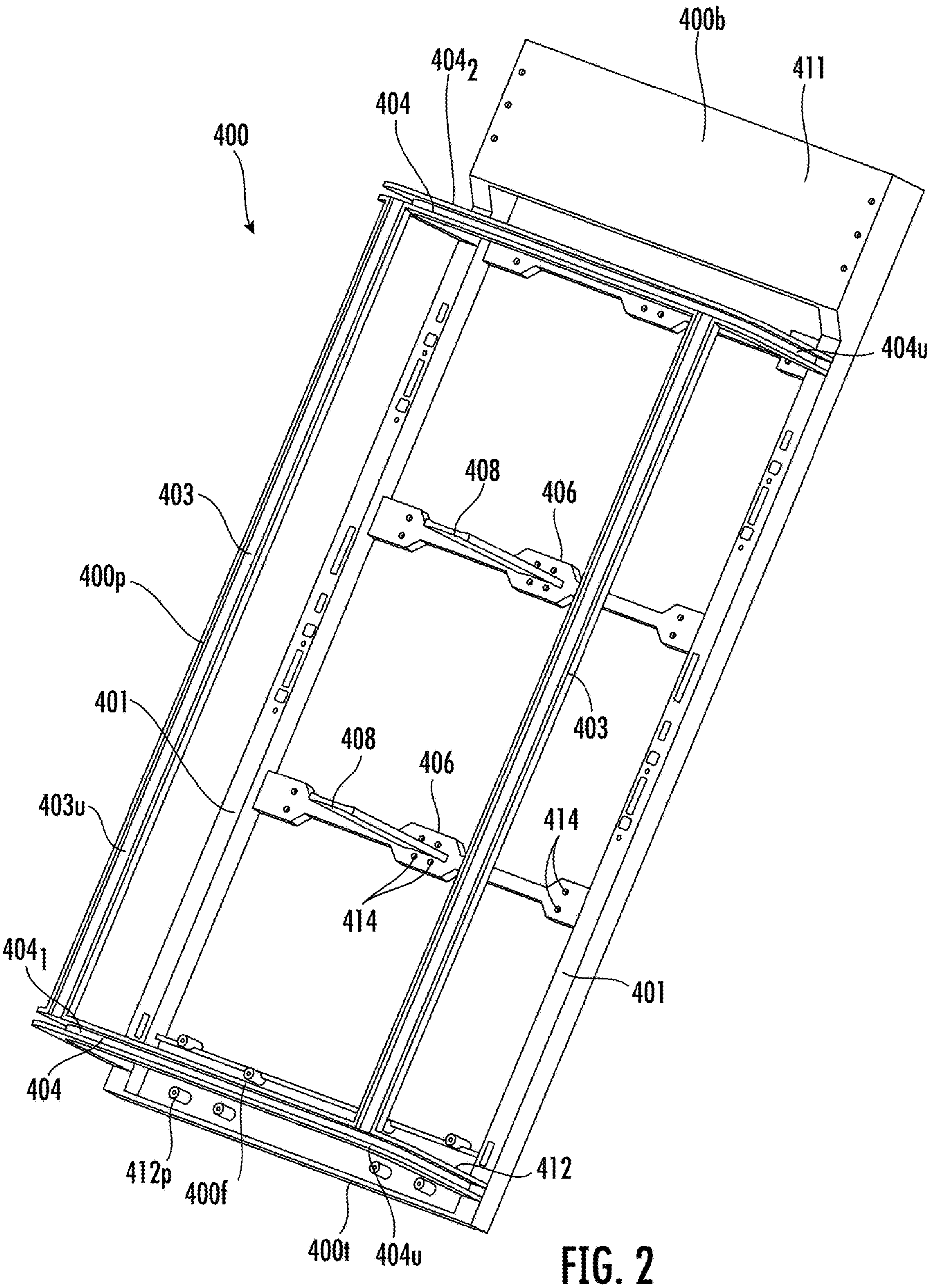
FIG. 2 is a front, side perspective view of an example cage configured to be held inside a housing of the base station antenna according to embodiments of the present invention.
Figure 3:
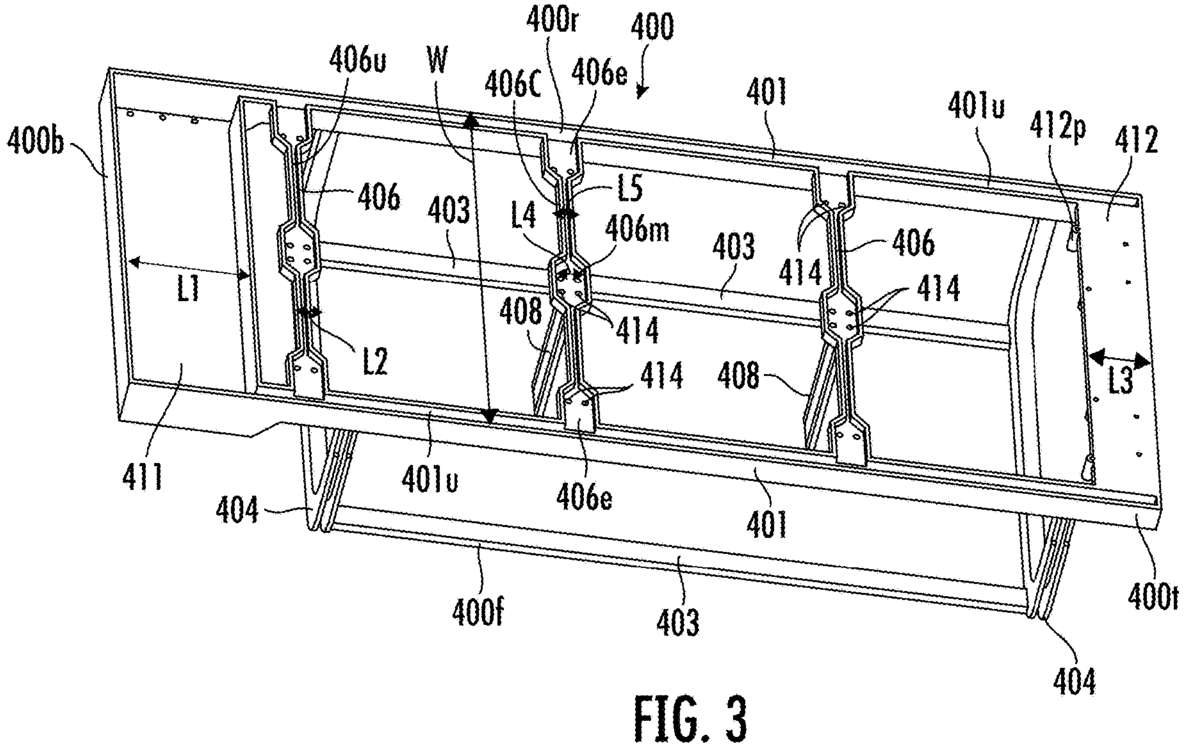
FIG. 3 is a rear, side perspective view of the example cage shown in FIG. 2.
Figure 4:
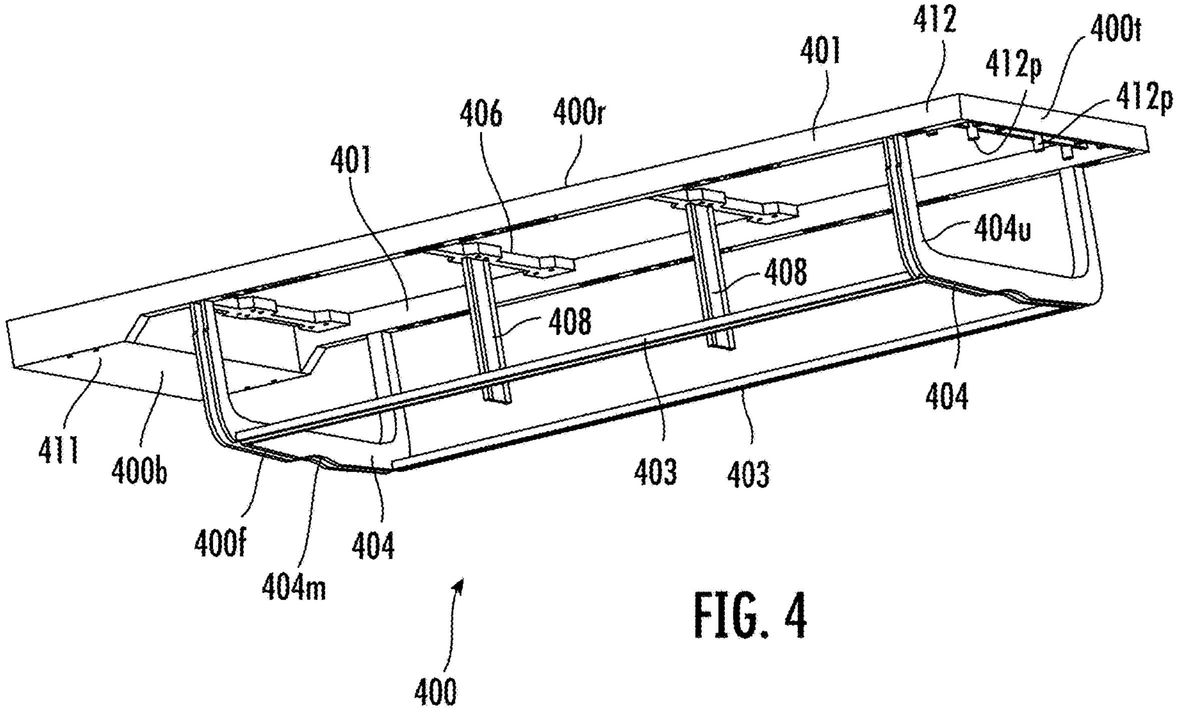
FIG. 4 is a front, side perspective view of the example cage shown in FIG. 2.

Referring now to FIGS. 2-4, an example cage 400 providing an internal structure of the base station antenna housing 100*h* is shown. The cage 400 can be non-metallic. The cage 400 can be a monolithic molded cage body 400*b*. The cage 400 can be a molded or extruded, dielectric body. The cage 400 can have a lightweight polymer or copolymer body.

The cage 400 comprises a front set 400*f* of longitudinally extending struts arranged to define a portion of (e.g., the long sides of) a rectangular perimeter 400*p*. The front set of struts 400*f* can be integrally attached to a back set 400*r* of longitudinally extending struts. The back set of struts 400*r* can merge into lower and upper lateral segments, 411, 412, respectively. The rear of the cage 400 can have a greater longitudinal extent than the front.

The front set of struts 400*f* can be configured with a pair of long (right and left) side struts 403 and the rear set of struts 400*r* can be configured with a pair of long (right and left) side struts 401. The long side struts 403 in the front 400*f* can be aligned with and spaced apart, in a Z or front-to back-direction, with the long side struts 401 of the rear set of struts 400*r*. The long side struts 401, 403 can extend in a longitudinal direction (Y direction) of the base station antenna housing 100*h*.

The cage 400 can also have a plurality of front lateral struts 404 and a plurality of rear lateral struts 406.

At least some of the lateral and longitudinal struts can have a "U" or "I" beam shaped cross-section, 401*u*, 403*u*, 404*u*, 406*u*, respectively, for increased structural rigidity.

The front lateral struts 404 can be arranged as two lateral struts, a first front lateral strut $\mathbf{404}_1$ can be positioned at a top portion 400*t* of the cage 400 and a second 4042 longitudinally spaced apart from and below the first front lateral strut $\mathbf{404}_1$, adjacent a bottom portion of the cage 400.

The rear lateral struts 406 can comprises fastener apertures 414 configured to receive respective fasteners to couple a matching layer and/or a reflector, such as a frequency selective surface FSS grid reflector, to the cage 400.

As shown, there are three narrow, rear lateral struts 406 of the same size and shape. The cage 400 can also comprise a bottom (lower) lateral segment 411 with a length L1 that is greater than a length L2 of the narrow, rear lateral struts 406. The term "narrow" means that the corresponding lateral struts have a length, in a longitudinal dimension of the base station antenna housing 100*h*, that is in a range of 2 inches and 0.25 inches.

The lateral segment 412 at the top portion 400*t* of the cage 400 can have a length L3 that is greater than the narrow struts 406 and less than the length L1 of the bottom lateral segment 411.

The bottom lateral segment 411 can be attached to a primary reflector 214. The primary reflector 214 can define or be coupled to metal rails 210 (FIG. 9) for increased rigidity/support.

Figure 7:
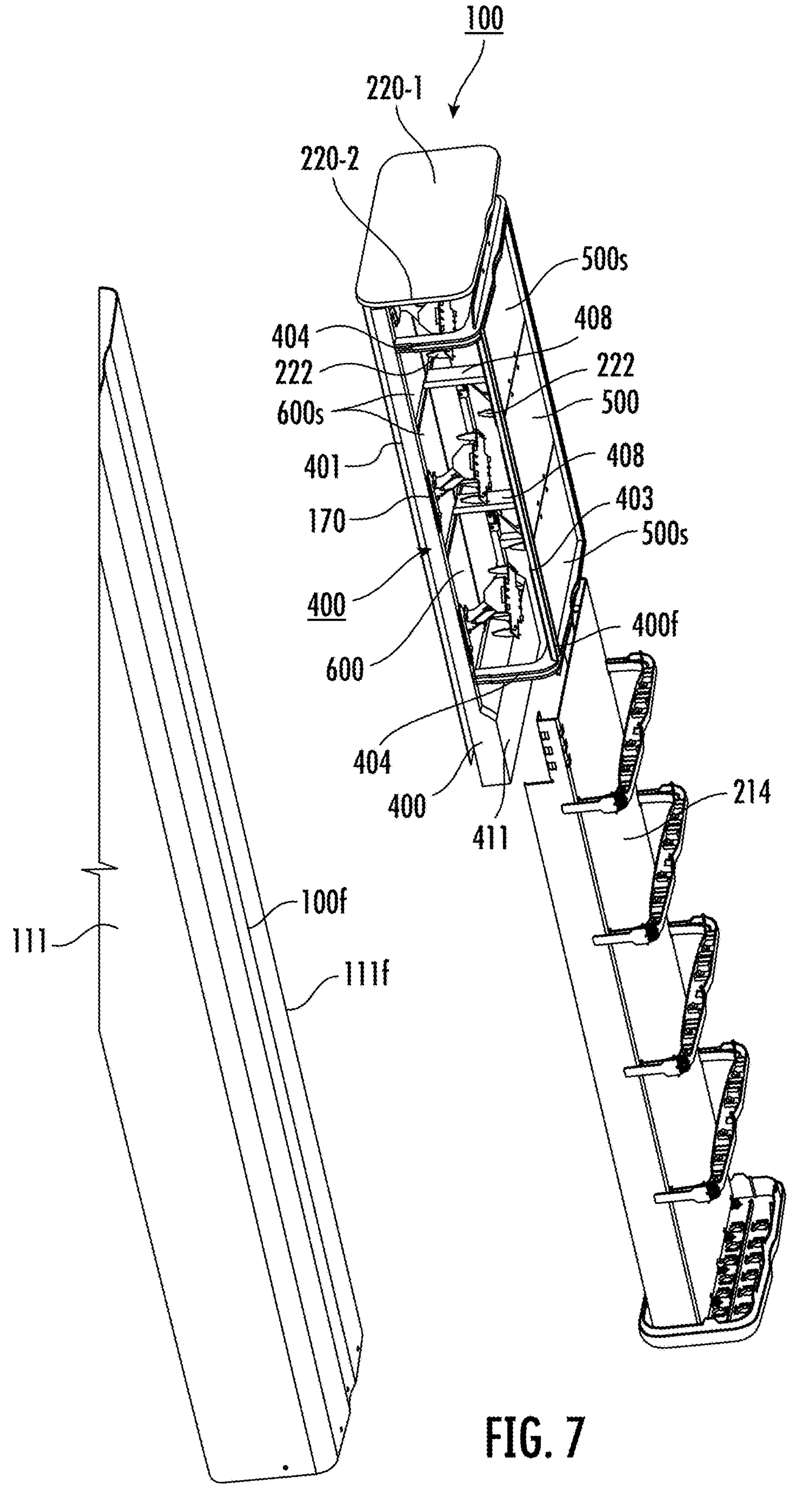
FIG. 7 is a side perspective view of example components of the base station antenna housing shown in FIG. 6, shown with the radome spaced apart from the housing and the cage aligned with but decoupled from a primary reflector to show an example interface configuration according to embodiments of the present invention.

The narrow, rear lateral struts 406 can extend laterally between the right and left rear long struts 401. Projecting members 408 can project forward from at least some of the narrow, rear lateral struts 406. The projecting members 408 can be coupled to a matching layer 500 (FIG. 7).

Fasteners 414 can be used to couple projecting members 408 that project forward of the narrow, rear lateral struts 406.

The rear lateral struts 406 can have a curvilinear shape over a lateral extent thereof (e.g., a width dimension "W") with a medial portion 406*m* and end portions 406*e* having a greater length L4 than a length L5 of a connecting segment 406*c* extending between the end portion 406*e* and the medial portion 406*m*.

The front lateral struts 404 can have a medial segment 404*m* that defines a curved recess that projects inward. The front radome 111*f* can have a corresponding shape. The In some embodiments, the cage 400 can be provided as a single-piece monolithic unitary body 400*b* that provides the front long sides 403, the back long sides 401, the lower lateral segment 411, the top lateral segment 412 and the front and back sets of lateral struts 404, 406 for increased structural rigidity.

The projecting members 408, where used, can be fastened to the rear lateral struts 406 or integrally molded or extruded therefrom.

Referring to FIGS. 5-9, the cage 400 can reside in the base station antenna housing 100*h* with a radome 111 extending about (surrounding) the cage 400. The cage 400 can reside at a top portion 100*t* of the base station antenna housing 100*h*.

As shown in FIG. 5, the front lateral struts 404 can have inwardly projecting tabs 404*t* that can be used to hold a matching layer 500. The tabs 404*t* can be used with or as an alternative to the projecting members 408 for supporting a matching layer 500, where used.

The top lateral segment 412 of the cage 400 can comprise posts 412*p* that can support a reflector 155 and/or a matching layer 600, for example.

The cage 400 can be configured to hold first and second matching layers, 500, 600, that are aligned and stacked apart in the Z (front to back) direction. Radiating elements 222 can be positioned inside the cage 400, in front of a reflector 155. The reflector 155 can be configured as a frequency selective surface ("FSS") 155*f*. In some embodiments, the FSS 155*f* can be provided by a sheet metal grid reflector 155*g*.

In some embodiments, a metal (strip) segment 170 can reside behind each column of radiating elements 222 in the cage 400 and be electrically coupled to the primary reflector 214.

Figure 8:
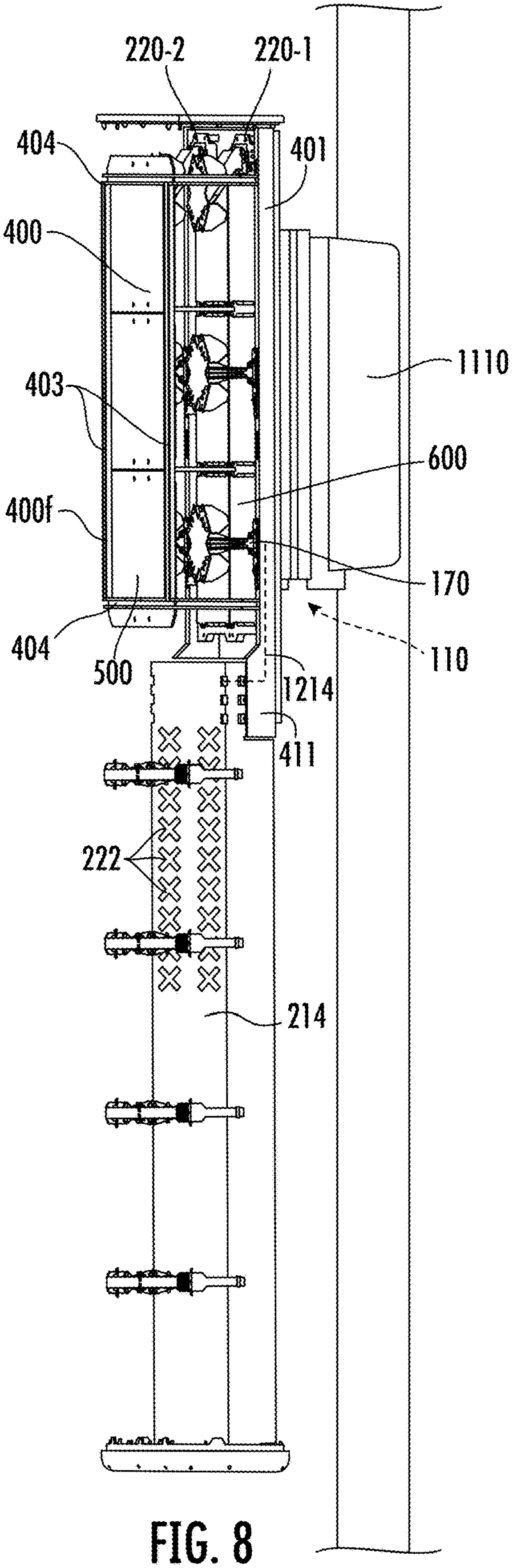
FIG. 8 is a side perspective view of the cage and primary reflector shown in FIG. 7 but with the two coupled together according to embodiments of the present invention.

In some embodiments, the lower (rearmost) lateral segment 412 of the cage 400 can be attached to the primary reflector 214 (FIG. 8). The FSS 155*f* can be either capacitively or galvanically electrically coupled to the primary reflector 214. The FSS 155*f* can reside behind and be electrically coupled to one or more feed boards that is/are connected to one or more radiating elements 222 to provide a common ground for the radiating elements 222. Thus, the feed boards can be indirectly supported by the cage. Optionally, the rear long side struts 401 can be metallized or provide an electrically conductive path 1214 between the metal segments 170 to the primary reflector 214 to provide a common electrical ground/backplane.

A rear matching layer 600 can be positioned behind the radiating elements 222, coupled to the cage 400 and can be either inside or outside the cage 400 0. For example, the matching layer 600 can be coupled to a front surface of the lateral struts 406 or to a rear surface of the lateral struts 406. The rear matching layer 600 can be behind a front matching layer 500 with the radiating elements 222 therebetween.

The matching layers 500, 600 can be provided as matching layer segments 500*s*, 600*s*, respectively. FIG. 7 shows that the front matching layer 500 can be provided as three cooperating matching layer segments 500*s* while the rear matching layer 600 can be provided as six matching layer segments. Other configurations of matching layers can be used.

In some embodiments, there are two linear arrays 220-1, 220-2 of radiating elements, some of which reside inside the cage 400, as shown, and some of which reside below the cage over a primary reflector 214 (shown schematically in FIG. 8).

Figure 9:
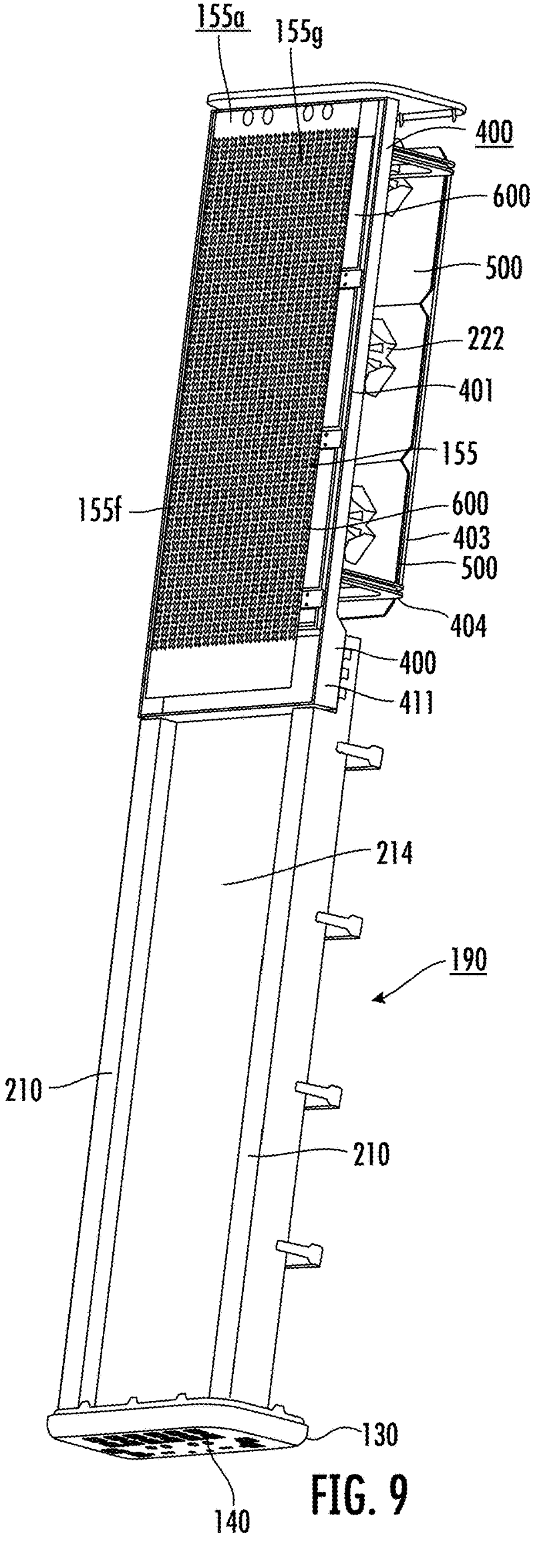
FIG. 9 is a rear, side perspective view of the base station antenna, shown without the radome and with the cage coupled to a frequency selective surface according to embodiments of the present invention.

Referring to FIG. 9, a reflector 155 can be coupled to the cage 400. The reflector 155 can have a frequency selective surface (FSS) 155*f* as discussed above. The reflector 155 can be a grid reflector 155*g* provided by sheet metal with an array of a patterned unit cells 155*a* of the same or differing shapes across and/or along the reflector body and can reside behind the rear lateral struts 406 and behind the rear matching layer 600, where used. The reflector 155 can have a longitudinal extent that is greater than a longitudinal extent of the front and/or rear matching layers 500, 600.

The reflector 155 can be attached to a rear of the top lateral segment 412 and a rear of the bottom lateral segment 411 of the cage 400.

Referring to FIG. 8, side walls 1110 of the active antenna module 110 can project rearward of a rear of the housing 100*h*. The side walls 1110 can be metal or a metallized plastic and/or comprise one or more surfaces arranged as an FSS. The sidewalls 1110 may form part of a PIM shield.

Passive inter-modulation distortion ("PIM") is a form of electrical interference that may occur when two or more RF signals encounter non-linear electrical junctions or materials along an RF transmission path. Such non-linearities may act like a mixer causing the RF signals to generate new RF signals at mathematical combinations of the original RF signals. These newly generated RF signals are referred to as "inter-modulation products."

The cage 400 can be configured to reduce PIM by eliminating metal joints used in conventional metal frame type structures.

Referring to FIGS. 5-9, a passive antenna assembly 190 resides in the housing 100*h*. The cage 400 resides in the housing 100*h* and radiating elements 222 reside in the cage. The cage 400 can also reside in front of radiating elements 1195 of the (mMIMO array) of the active antenna module 110 and the active antenna module 110 can (directly or indirectly) attach to the cage 400.

The cage 400 can be attached to the primary reflector 214. The primary reflector 214 can have a solid reflection surface for antenna elements residing in front of the primary reflector 214 and may reside over operational components 314, such as filters, tilt adjusters and the like. The primary reflector 214 can extend forwardly of and be parallel to the reflector 155 with the array of unit cells 155*a* providing an FSS 155*f*. The primary reflector 214 can reside in a different plane than the reflector 155 with the FSS 155*f*.

The at least one matching layer 500, 600 can be configured to adjust the radiation pattern generated by radiating elements positioned behind the at least one matching layer. The matching layer(s) 500, 600 can be configured to reduce reflections that may otherwise occur because certain radiating elements are relatively far way (behind) the front radome, placing the front radome in the far-field of these radiating elements. Dielectric materials that form the front radome 111*f* and/or rear radome 111*r* of the passive antenna 100*h* typically have frequency selectivity to electromagnetic waves. The higher the frequency of the electromagnetic waves, the greater the effect of the dielectric materials thereon, such as poorer transmittance and higher reflectivity. Poorer transmittance may cause the signal strength of the electromagnetic waves to be reduced, thereby causing the gain of the base station antenna to be reduced. The higher the reflectivity, the more the electromagnetic waves are reflected by the radome 111*f*, 111*r* and these reflected waves superimpose with the electromagnetic waves radiated by the radiating elements, which cause jitters and ripples in the radiation pattern. These are undesirable effects.

In order to compensate for the adverse effects of the radome of the passive antenna device 100*h*/190, such as the front radome 111*f*, on the electromagnetic waves from the active antenna unit 110, a matching (dielectric) layer 500 and/or 600 may be provided in the passive antenna device 190, where the matching layer 500 and/or 600 may be arranged between the radiating element array 220 and the front radome 111*f*. The matching layer 500 and/or 600 may have a certain thickness and dielectric constant, and the dielectric constant of the matching layer 500 and/or 600 is larger than the dielectric constant of air. Design personnel may adjust the reflection of the electromagnetic waves from the active antenna unit 110 by designing the thickness and dielectric constant of the matching layer 500 and/or 600 such that these reflected waves superimpose out of phase and even anti-phase to reduce the reflectivity of the entire radome, thereby allowing the reflectivity and transmittance of the entire radome to meet design goals.

The distance between the matching layer 500 and/or 600 and the front radome 111*f* of the passive antenna device 100*h* may be any suitable distance.

The distance between the rear radome 111*r*/100*r* of the passive antenna device 100*h* and the matching layer 500 and/or 600 is up to a first distance D1, and the distance between the active antenna unit 110, such as the front radome 119 thereof, and the rear radome 111*r*/100*r* of the passive antenna device 100*h* is up to a second distance D2. The first distance may be selected as 0.25+n/2 times that of the equivalent wavelength, where n is a positive integer (such as 1, 2, 3, 4, . . . ) and the second distance may be selected as 0.25+N/2 times of the equivalent wavelength, where N is a natural number (such as 0, 1, 2, . . . ). The equivalent wavelength is associated with a wavelength corresponding to the center frequency of the operating frequency band of the radiating elements in the active antenna unit 110, such as the theoretical wavelength in an air medium or in vacuum. In other words, the selection of the first distance D1 and the second distance D2 in the passive antenna device 100*h* is related to the operating frequency band of the radiating elements 1195 in the active antenna unit 110. By selecting an appropriate distance, the reflection of the electromagnetic waves from the active antenna unit 110 by the passive antenna device 100*h* may be effectively reduced.

The distance between the matching layer 500 and/or 600 and the front radome 111*f* of the passive antenna device 100*h* may be up to a third distance D3, which may be selected as 0.25+M/2 times the equivalent wavelength, where M is a natural number (such as 0, 1, 2, . . . ).

In some embodiments, the equivalent wavelength may be within the range of 0.8 to 1.2 times the wavelength corresponding to the center frequency. In some embodiments, the equivalent wavelength may be within the range of 0.9 to 1.1 times the wavelength corresponding to the center frequency. In some embodiments, the equivalent wavelength may be equivalent to the wavelength corresponding to the center frequency.

As an example, where the operating frequency band of the radiating elements in the active antenna unit 110 is 2.2-4.2 GHZ, the center frequency may be selected as 3.2 GHZ. The wavelength corresponding to the center frequency may be approximately 90 mm. When the equivalent wavelength is equivalent to the wavelength corresponding to the center frequency, the first distance D1 may be 67.5 mm (n=1), 112.5 mm (n=2), 157.5 mm (n=3) . . . 67.5+ (n−1)*45 mm, and the specific size may be determined based on actual needs. At the same time, the second distance D2 may be selected as 22.5+N*45 mm, and the third distance D3 may be selected as 22.5+M*45 mm. Typically, in order to reduce the size of the base station antenna, N and M may be selected as 0.

Again, it should be understood that the aforementioned matching layer 500 and/or 600 is not required.

It should be understood that when the distance between two dielectric layers is selected as 0.25+n/2 times the equivalent wavelength, the aforementioned effects may similarly be applicable. For this, design personnel may consider the requirements on the size of the base station antenna while adjusting the distance between two adjacent dielectric layers such that these reflected waves superimpose out of phase and even anti-phase to reduce the reflectivity in the entire transmission process, thereby allowing the reflectivity and transmittance of high-frequency electromagnetic waves to meet the design goals.

The first matching layer 500 can be provided in a different configuration than the second matching layer 600. For example, the first matching layer 500 can be provided as a plurality of first matching layer segments **500*s* while the second matching layer 600 can be a unitary, monolithic sheet of material. The first matching layer 500 may be used alone without a second matching layer 600. The second matching layer 600 can be used alone without the first matching layer 500. Additional matching layers may be provided in front of or behind one or both of the first or second matching layers 500, 600** (not shown).

The reflector providing the FSS 155 can be configured to allow high band radiating elements (typically located in the active antenna module 110) to propagate electromagnetic waves therethrough and to reflect lower band RF signals (lower band electromagnetic waves) from lower band radiating elements projecting forward of the FSS **155*f***.

The FSS 155 can reside across a rear of the cage 400 in front of the active antenna module/unit 110. See, e.g., U.S. patent application Ser. No. 17/468,783 and U.S. Provisional Patent Application Ser. No. 63/236,727, for examples of FSS and reflector configurations, the contents of which are hereby incorporated by reference as if recited in full herein.

The FSS **155*f* can be provided by any suitable material(s) such as, for example, a printed circuit board with a metal grid pattern of metal patches, a non-metallic substrate comprising a metallized surface in a grid pattern 155*g* or a sheet or sheets of metal provided with a grid pattern 155*g***.

The grid pattern **155*g* can be arranged in any suitable manner and may be symmetric or asymmetric across a width and/or length of the FSS 155*f*. Unit cells of the grid pattern 155*g* may be the same across and along the FSS 155*f*** or may have different shapes and/or sizes.

The FSS **155*f*** can comprise, in some embodiments, a metamaterial, a suitable RF material or even air (although air may require a more complex assembly). The term "metamaterial" refers to composite electromagnetic (EM) materials. Metamaterials may comprise sub-wavelength periodic microstructures.

The FSS **155*f* can be provided as one or more cooperating layers. In some embodiments, the FSS 155*f*** can include a substrate that has a dielectric constant in a range of about 2-4, such as about 3.7 and a thickness of about 5 mil and metal patterns formed on the dielectric substrate. The thickness can vary but thinner materials can provide lower loss.

The FSS **155*f* can be configured to allow RF energy (electromagnetic waves) to pass through at one or more first defined frequency band(s) and that is configured to reflect RF energy at a different second frequency band. Thus, the FSS 155*f* can reside behind at least some radiating antenna elements 222 of the passive antenna assembly 190 and can selectively reject some frequency bands and permit other frequency bands such as those of the radiating elements 1195 of the active antenna 110** to pass therethrough by including the frequency selective surface and/or substrate to operate as a type of "spatial filter".

A discussion of some example FSSs can be found in Ben A. Munk, Frequency Selective Surfaces: Theory and Design, ISBN: 978-0-471-37047-5; DOI:10.1002/0471723770; April 2000, Copyright © 2000 John Wiley & Sons, Inc., the contents of which are hereby incorporated by reference as if recited in full herein. See also, co-pending U.S. patent application Ser. No. 17/468,783, the contents of which are also incorporated by reference as if recited in full herein.

In some embodiments, the FSS **155*f* may be implemented by forming the frequency selective surface on a printed circuit board, optionally a flex circuit board. In some embodiments, a multi-layer printed circuit board can comprise one or more layers which form the FSS 155*f*** configured such that electromagnetic waves within a predetermined frequency range cannot propagate therethrough and one or more other predetermined frequency range associated with the one or more layers of the multi-layer printed circuit board is allowed to pass therethrough. The unit cell array pattern can comprise shaped metal patches of any suitable geometry.

In some embodiments, the FSS **155*f* is provided by a sheet or sheets of metal that is/are stamped, punched, acid etched, or otherwise formed to provide a grid pattern 155*g*. The grid pattern 155*g*** can be configured to have closed or open unit cells of any suitable geometry.

The FSS **155*f* can be provided as a single layer of sheet metal providing the grid pattern 155*g*** with the unit cells and with the open centers or interiors devoid of metal. For further discussion of FSS grids, see co-pending U.S. patent application Ser. No. 17/787,619, the contents of which are hereby incorporated by reference as if recited in full herein.

The passive antenna assembly 190 comprises multiple arrays of radiating elements, typically provided in columns, with radiating elements that extend forwardly from the primary reflector 214, with some columns of radiating elements continuing to extend in front of the FSS **155*f***.

The arrays of radiating elements of the passive antenna assembly 190 may comprise radiating elements 222 that are configured to operate in a first frequency band and radiating elements that are configured to operate in a second frequency band. Other arrays of radiating elements may comprise radiating elements that are configured to operate in either the second frequency band or in a third frequency band. The first, second and third frequency bands may be different frequency bands (although potentially overlapping). In some embodiments, low band radiating elements 222 that are configured to operate in some or all of the 617-960 MHz frequency band) can reside in front of the FSS 155*f*.

The passive antenna assembly 190 of the base station antenna 100 can include one or more arrays 220-1, 220-2 of low-band radiating elements 222, one or more arrays of first mid-band radiating elements, one or more arrays of second mid-band radiating elements and optionally one or more arrays of high-band radiating elements. The radiating elements may each be dual-polarized radiating elements. Further details of radiating elements can be found in co-pending WO2019/236203 and WO2020/072880, the contents of which are hereby incorporated by reference as if recited in full herein. Some of the high band radiating elements, such as radiating elements 1195, can be provided as a mMIMO antenna array and may be provided in the active antenna module 110.

The low-band radiating elements 222 may be configured to transmit and receive signals in a first frequency band. In some embodiments, the first frequency band may comprise the 617-960 MHz frequency range or a portion thereof (e.g., the 617-896 MHZ frequency band, the 696-960 MHz frequency band, etc.). The low-band linear arrays 220 may or may not be used to transmit and receive signals in the same portion of the first frequency band. For example, in one embodiment, the low-band radiating elements 222 in a first linear array 220 may be used to transmit and receive signals in the 700 MHz frequency band and the low-band radiating elements 222 in a second linear array 220 may be used to transmit and receive signals in the 800 MHz frequency band. In other embodiments, the low-band radiating elements 222 in both the first and second linear arrays may be used to transmit and receive signals in the 700 MHZ (or 800 MHZ) frequency band (e.g., to support 4×MIMO operation).

The linear array of first mid-band radiating elements may extend along the cage 400, in front of the FSS 155*f* and along the main reflector 214. The first mid-band radiating elements may be configured to transmit and receive signals in a second frequency band. In some embodiments, the second frequency band may comprise the 1427-2690 MHZ frequency range or a portion thereof (e.g., the 1710-2200 MHz frequency band, the 2300-2690 MHz frequency band, etc.). In the depicted embodiment, the first mid-band radiating elements are configured to transmit and receive signals in the lower portion of the second frequency band (e.g., some or all of the 1427-2200 MHz frequency band). The linear arrays of first mid-band radiating elements may be configured to transmit and receive signals in the same portion of the second frequency band or in different portions of the second frequency band.

The second mid-band radiating elements can be mounted in columns to form linear arrays of second mid-band radiating elements. The second mid-band radiating elements may be configured to transmit and receive signals in the second frequency band. The second mid-band radiating elements may be configured to transmit and receive signals in an upper portion of the second frequency band (e.g., some, or all, of the 2300-2700 MHZ frequency band). The second mid-band radiating elements may have a different design than the first mid-band radiating elements.

The high-band radiating elements can be mounted in columns in the upper medial or center portion of antenna 100*h* to form a multi-column (e.g., four or eight column) array of high-band radiating elements. The high-band radiating elements may be configured to transmit and receive signals in a third frequency band. In some embodiments, the third frequency band may comprise the 3300-4200 MHz frequency range or a portion thereof.

In the depicted embodiment, the arrays of low-band radiating elements, the arrays of first mid-band radiating elements, and the arrays of second mid-band radiating elements are all part of the passive antenna assembly 190, while the array of high-band radiating elements 1195 are part of the active antenna module 110. It will be appreciated that the types of arrays included in the passive antenna assembly 190, and/or the active antenna module 110 may be varied in other embodiments.

It will also be appreciated that the number of linear arrays of low-band, mid-band and high-band radiating elements may be varied from what is shown in the figures. For example, the number of linear arrays of each type of radiating elements may be varied from what is shown, some types of linear arrays may be omitted and/or other types of arrays may be added, the number of radiating elements per array may be varied from what is shown, and/or the arrays may be arranged differently. As one specific example, two linear arrays of second mid-band radiating elements may be replaced with four linear arrays of ultra-high-band radiating elements that transmit and receive signals in a 5 GHz frequency band.

Each array 220 of low-band radiating elements 222 may be used to form a pair of antenna beams, namely an antenna beam for each of the two polarizations at which the dual-polarized radiating elements are designed to transmit and receive RF signals. Likewise, each array of first mid-band radiating elements, and each array of second mid-band radiating elements may be configured to form a pair of antenna beams, namely an antenna beam for each of the two polarizations at which the dual-polarized radiating elements are designed to transmit and receive RF signals. Each linear array may be configured to provide service to a sector of a base station. For example, each linear array may be configured to provide coverage to approximately 120° in the azimuth plane so that the base station antenna 100 may act as a sector antenna for a three-sector base station. Of course, it will be appreciated that the linear arrays may be configured to provide coverage over different azimuth beamwidths. While all of the radiating elements can be dual-polarized radiating elements in the depicted embodiments, it will be appreciated that in other embodiments some or all of the dual-polarized radiating elements may be replaced with single-polarized radiating elements. It will also be appreciated that while the radiating elements are illustrated as dipole radiating elements in the depicted embodiment, other types of radiating elements such as, for example, patch radiating elements may be used in other embodiments.

RF connectors or "ports" 140 (FIG. 9) can be mounted in the bottom end cap 130 that are used to couple RF signals from external remote radio units (not shown) to the arrays of the passive antenna assembly 190. Two RF ports can be provided for each array, namely a first RF port 140 that couples first polarization RF signals between the remote radio unit and the arrays and a second RF port 140 that couples second polarization RF signals between the remote radio unit and the arrays. As the radiating elements can be slant cross-dipole radiating elements, the first and second polarizations may be a −45° polarization and a +45° polarization.

A phase shifter may be connected to a respective one of the RF ports 140. The phase shifters may be implemented as, for example, wiper arc phase shifters such as the phase shifters disclosed in U.S. Pat. No. 7,907,096 to Timofeev, the disclosure of which is hereby incorporated herein in its entirety. A mechanical linkage may be coupled to a RET actuator (not shown). The RET actuator may apply a force to the mechanical linkage which in turn adjusts a moveable element on the phase shifter in order to electronically adjust the downtilt angles of antenna beams that are generated by the one or more of the low-band or mid-band linear arrays.

It should be noted that a multi-connector RF port (also referred to as a "cluster" connector) can be used as opposed to individual RF ports 140. Suitable cluster connectors are disclosed in U.S. patent application Ser. No. 16/375,530, filed Apr. 4, 2019, the entire content of which is incorporated herein by reference.

The radiating elements 220 can be dipole elements configured to operate in some or all the 617-960 MHz frequency band. Further discussions of example antenna elements including antenna elements comprising feed stalks can be found in U.S. patent application Ser. No. 17/205,122, the contents of which are hereby incorporated by reference as if recited in full herein.

Embodiments of the present invention have been described above with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present invention. As used herein, the term "and/or" includes any and all combinations of one or more of the associated listed items.

It will be understood that when an element is referred to as being "on" another element, it can be directly on the other element or intervening elements may also be present. In contrast, when an element is referred to as being "directly on" another element, there are no intervening elements present. It will also be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between", "adjacent" versus "directly adjacent", etc.)

Relative terms such as "below" or "above" or "upper" or "lower" or "horizontal" or "vertical" may be used herein to describe a relationship of one element, layer or region to another element, layer or region as illustrated in the figures. It will be understood that these terms are intended to encompass different orientations of the device in addition to the orientation depicted in the figures.

The term "about" used with respect to a number refers to a variation of +/−10%.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" "comprising," "includes" and/or "including" when used herein, specify the presence of stated features, operations, elements, and/or components, but do not preclude the presence or addition of one or more other features, operations, elements, components, and/or groups thereof.

Aspects and elements of all of the embodiments disclosed above can be combined in any way and/or combination with aspects or elements of other embodiments to provide a plurality of additional embodiments.

That which is claimed is:

1. A base station antenna, comprising:

a base station antenna housing comprising a front radome and a rear; and a cage that comprises a non-metallic substrate positioned inside the base station antenna housing, wherein the cage has a front with a rectangular closed outer perimeter, and wherein the rectangular closed outer perimeter is provided by first and second longitudinally extending struts that are laterally spaced apart and that have respective longitudinally spaced apart first and second end portions, a first laterally extending strut at the first end portions of the first and second longitudinally extending struts, and a second laterally extending strut at the second end portions of the first and second longitudinally extending struts.

2. The base station antenna of claim 1, wherein the cage is a monolithic unitary body, wherein the first and second longitudinally extending struts and the first and second laterally extending struts bound an open space, and wherein the first and second laterally extending struts are the only cross-struts at the front of the cage.

3. The base station antenna of claim 1, further comprising a primary reflector in the base station antenna housing and a first column of radiating elements with some of the radiating elements residing inside the cage and others of the radiating elements residing beneath the cage, wherein the cage resides above and is attached to the primary reflector.

4. The base station antenna of claim 1, further comprising first and second longitudinally extending struts at a rear of the cage, with the first and second longitudinally extending struts at the rear aligned in a front-to-back direction with the first and second longitudinally extending struts at the front, wherein the cage further comprises four corners with strut segments extending between the front and the rear that are integral to or affixed to the first and second longitudinally extending struts at the front and the first and second longitudinally extending struts at the rear, and wherein the base station antenna further comprises a plurality of laterally extending struts extending inward from and between the first and second longitudinally extending struts at the rear of the cage.

5. The base station antenna of claim 3, wherein the cage comprises an electrically conductive ground path between the primary reflector and a metal segment residing behind at least one of the radiating elements in the cage and/or the primary reflector and a grid reflector coupled to the cage are electrically coupled.

6. The base station antenna of claim 1, further comprising a reflector coupled to the cage.

7. The base station antenna of claim 6, wherein the reflector comprises a frequency selective surface that is coupled to the rear of the cage.

8. The base station antenna of claim 1, further comprising a plurality of longitudinally spaced apart narrow, rear laterally extending struts that are co-planar with the first and second longitudinally extending struts at the rear of the cage.

9. A base station antenna, comprising:

a base station antenna housing comprising a front radome and a rear; and a cage comprising a plurality of laterally and longitudinally extending struts positioned inside the base station antenna housing, wherein the laterally extending struts comprise a plurality of longitudinally spaced apart narrow, rear lateral struts, wherein the narrow, rear lateral struts have a medial segment between first and second end segments and a first connecting segment between the medial segment and the first end segment and a second connecting segment between the medial segment and the second end segment, wherein the first end segment is coupled to a rear, right side longitudinally extending strut of the plurality of longitudinally extending struts and the second end segment is coupled to a rear, left side longitudinally extending strut of the plurality of longitudinally extending struts, and wherein the first and second end segments and the medial segments have a greater longitudinal extent than the first and second connecting segments.

10. The base station antenna of claim 1, further comprising at least one matching layer coupled to the cage.

11. The base station antenna of claim 9, further comprising a plurality of longitudinally spaced apart projecting members, one projecting member coupled to one medial segment of the medial segments of the narrow lateral struts.

12. The base station antenna of claim 1, further comprising an active antenna module coupled to the rear of the base station antenna housing, the active antenna module comprising a multiple column array of radiating elements behind the cage.

13. The base station antenna of claim 1, further comprising a front matching layer and a spaced apart back matching layer, each coupled to the cage.

14. The base station antenna of claim 1, further comprising a plurality of radiating elements inside the cage, and a frequency selective surface coupled to the cage and positioned behind the plurality of radiating elements, wherein the frequency selective surface is configured to reflect, absorb or block electromagnetic waves from the radiating elements and allow higher band electromagnetic waves to travel therethrough toward the front radome.

15. The base station antenna of claim 1, further comprising an active antenna unit coupled to the base station antenna housing, and a frequency selective surface coupled to the cage, wherein the active antenna unit comprises an array of radiating elements facing the cage, and wherein the array of radiating elements of the active antenna unit are configured to propagate RF energy through a rear radome of the base station antenna housing and through the frequency selective surface.

16. The base station antenna of claim 1, wherein the first and second longitudinally extending struts at the front and the first and second longitudinally extending struts at the rear bound therebetween an elongate open space extending in the X, Y and Z directions.

17. The base station antenna of claim 1, wherein the first and second longitudinally extending struts and the first and second laterally extending struts have a “U” shaped cross-section.

18. A base station antenna comprising:

a base station antenna housing comprising a front radome;

a primary reflector in the base station antenna housing;

a plurality of columns of first radiating elements configured for operating in a first operational frequency band positioned inside the base station antenna housing, each column of first radiating elements comprising a plurality of first radiating elements arranged in a longitudinal direction; and a cage inside the base station antenna housing coupled to the primary reflector, wherein the cage is formed of a non-metallic substrate and comprises a monolithic cage body comprising a front set of longitudinally extending struts arranged to define long sides of a rectangular outer perimeter of a front of the cage, wherein the cage further comprises a back set of longitudinally extending struts that are bounded by upper and lower end portions that extend laterally and longitudinally, wherein the cage comprises a plurality of laterally extending struts that connect to and extend between the back set of longitudinally extending struts, and wherein the back set of longitudinally extending struts, the plurality of laterally extending struts, and the upper and lower end portions together define a rear of the cage.

19. The base station antenna of claim 18, further comprising a frequency selective surface (FSS) that is coupled to the cage and to the primary reflector, wherein the FSS resides inside or behind the cage and behind the plurality of columns of first radiating elements, and wherein the FSS is configured to reflect electromagnetic waves within the first operational frequency band.

20. The base station antenna of claim 18, wherein the front and back sets of longitudinally extending struts define the outer perimeter of the cage and are aligned in X and Y directions and are spaced apart in a Z direction of the base station antenna housing.

21. The base station antenna of claim 20, wherein the front set of longitudinally extending struts extend between and are coupled to, a bottom, front lateral strut and a top, front lateral strut of the cage with the front set of longitudinally extending struts terminating at the bottom, front lateral strut and the top, front lateral strut, wherein the front lateral struts are substantially co-planar with the front set of longitudinally extending struts, and wherein the cage is positioned above the primary reflector.

* * * * *